Sept. 1, 1964     E. P. FRANZEN ETAL     3,147,084
TUBULAR CATALYTIC REACTOR WITH COOLER
Filed March 8, 1962     2 Sheets-Sheet 1

INVENTORS:
EARL P. FRANZEN
RUSSEL L. MAYCOCK
LEIGH E. NELSON
WILLIAM C. SMITH
BY: *Oswald H. Milmore*
THEIR ATTORNEY Sept. 1, 1964    E. P. FRANZEN ETAL    3,147,084
TUBULAR CATALYTIC REACTOR WITH COOLER
Filed March 8, 1962    2 Sheets-Sheet 2

INVENTORS:
EARL P. FRANZEN
RUSSEL L. MAYCOCK
LEIGH E. NELSON
WILLIAM C. SMITH
BY: *Oswald H. Milmore*
THEIR ATTORNEY

United States Patent Office 3,147,084
Patented Sept. 1, 1964

3,147,084
TUBULAR CATALYTIC REACTOR WITH COOLER
Earl P. Franzen, Russel L. Maycock, Leigh E. Nelson, and William C. Smith, all of Houston, Tex., assignors to Shell Oil Company, New York, N.Y., a corporation of Delaware
Filed Mar. 8, 1962, Ser. No. 178,352
3 Claims. (Cl. 23—288)

The invention relates to an integral tubular catalytic reactor-cooler, suitable for carrying out catalyzed chemical reactions, such as the oxidation of hydrocarbons, in which it is necessary to cool the reacted stream promptly to prevent or reduce undesired side reactions.

It is known to carry out such catalytic reactions in tubular reactors which comprise a plurality of tubes filled with granular catalyst, said tubes being mounted between spaced tube sheets within a vessel through which a thermal fluid is passed to control the reaction temperature by conduction of heat through the tube walls. When the reaction is exothermic the thermal fluid is usually a coolant, although it may in certain instances, as when the reaction is only mildly exothermic, be used to conduct heat to the reactant stream. In such processes the reacted stream which issues from the catalyst-filled reaction tubes was collected beyond the downstream tube sheet and conducted through a pipe to a cooling heat exchanger for cooling the stream to below the reaction temperature.

A drawback of such arrangements has been that deleterious side reactions, such as thermal reactions of the residual oxygen in the product stream, occurred in the time between discharge from the reaction tubes and the entry to the cooler. This situation is particularly severe in the case of large reactors and/or in the case of high-pressure operations, in which it is, for structural reasons, necessary to provide a dome-shaped closure to the vessel beyond the downstream tube sheet, thereby providing a relatively large volume and increasing the residence time of the stream.

According to one solution to this difficulty the reaction vessel has been provided with a partition spaced a short distance, such as one or two inches, from the downstream tube sheet and the cooling heat exchanger was mounted partially within the reaction vessel, extending into the vessel through a large opening in the dome, so as to bring the inlet end of the exchanger into close proximity to the outlet means of the reaction tubes. This expedient, however, involves a complex construction.

It is the object of this invention to provide a simple construction of a tubular catalytic reactor wherein the reacted stream is cooled rapidly after the reaction is completed.

A further object is to suppress side reactions in the reacted stream.

In summary, according to the invention the reactor and cooler are combined into one unit by providing by means of tubular walls, a plurality of passages that extend through at least three tube sheets, said tube sheets defining in the reaction vessel at least two separated chambers for the flows of thermal fluids externally to the walls at different temperatures, at least one and, usually, both of said fluids being coolants and the said chambers being closely adjacent to one another, at least the portions of said passages situated within the chamber which lies near the inlet ends of the tubes (forming the reaction zones) containing catalyst, e.g., in the form of granules or coated on the interior tube surfaces.

By this arrangement the reaction stream flows from the reaction zones directly into the cooling zones, which are surrounded by the coolant in the other chamber, and the time required for cooling the stream to below the reaction temperature is significantly reduced.

The tubes may be sealed to the intermediate tube sheet to isolate the chambers and permit the thermal fluids which flow through the two chambers to have different compositions and/or to be at different pressures. However, a tight seal is not always necessary at the intermediate tube, as when the same thermal fluid is used in the two chambers for cooling both or for heating and cooling, respectively; a loose-fitting partition is in this case mechanically preferable.

The tubes which define the said passages may extend continuously from the tube sheet at the inlet ends through one or more intermediate tube sheets to the tube sheet at the discharge ends, or may be discontinuous but so arranged that the passages defined thereby are substantially continuous. For example, each such passage can be defined by two coaxial tubes mounted in close relation to one another, each said tube being mounted in a pair of tube sheets; or the coaxial tubes can be mutually sealed in telescoped relation.

The partition or intermediate tube sheet can be constructed of various materials, e.g., metal, ceramic or plastic, which may differ from the end tube sheets, dependent upon service conditions.

Broadly, the portions of the tubes within the cooling chamber may be empty or may contain catalyst or be filled with solid material providing a multitude of flow passages, e.g., granular material. However, according to a feature of the invention, especially useful in such applications as the oxidation of olefins, side reactions, viz., thermal reactions of the residual oxygen in the product stream emerging from the reaction zones, are suppressed during the short cooling period by filling at least the inlet parts of the tube portions in the cooling chamber with such solid material, in a manner to provide a high surface-to-volume ratio. The said solid material may be catalytic, e.g., the same as that used in the reactions zones or may be inert. It is preferably a good heat conductor, whereby the rapid cooling of the reacted stream is promoted.

The invention will be further described with reference to the accompanying drawing forming a part of this specification and showing several specific embodiments by way of illustration, wherein.

Figure 1:
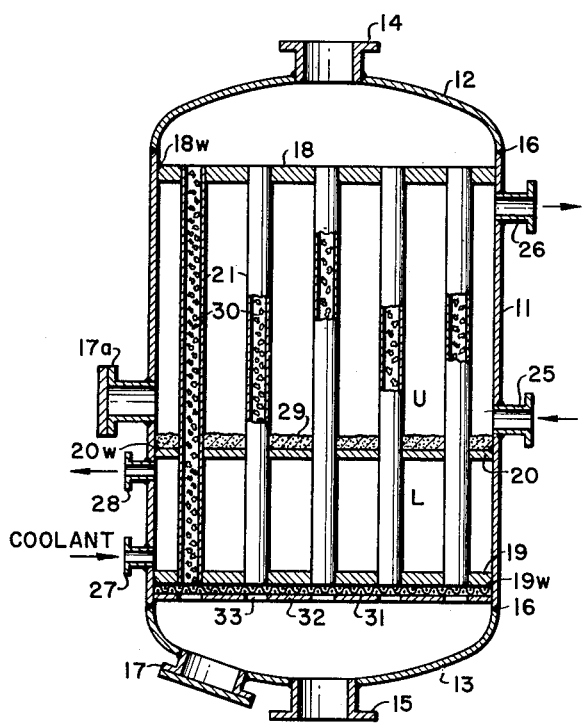
FIGURE 1 is a vertical sectional view through an integral reactor-cooler according to the invention.

Referring to FIGURES 1–4, the reactor comprises a vessel 11 having dome-shaped end closures 12 and 13 at the top and bottom, an inlet nozzle 14 at the top for admission of a feed stream and an outlet nozzle 15 at the bottom for discharge of the reacted stream. These domes may be welded to the cylindrical part of the vessel as indicated at 16.

Manways, such as that indicated at 17 and 17a may be provided and are closed by covers. The vessel contains upper and lower tube sheets 18, 19 and an intermediate tube sheet or partition 20, which may be welded to the vessel wall as indicated at 18w, 19w, and 20w. A plurality of tubes 21 having heat-transfer walls extend through the three tube sheets in sealed relation thereto. Any suitable method of sealing may be used, depending upon the operating conditions. In the example shown, the tubes are welded to the upper and lower tube sheets as indicated at 22 and 23 in FIGURES 2 and 4, respectively, and may be rolled into one or more annular grooves in the intermediate tube sheet as indicated at 24 in FIGURE 3 by the use of an internally expanding roller. The vessel is thereby separated into two isolated chambers, U and L, each bounded peripherally by the vessel 11 and at the top and bottom by a pair of tube sheets. (As was previously noted, it is not always necessary to provide a seal between the tubes and the intermediate partition 20, and a loose fit may be provided.) A thermal fluid, usually a coolant, can be circulated through the upper chamber U in external contact with the parts of the tubes therein by admitting it through a lateral nozzle 25 and discharging it through a lateral nozzle 26, while a cooling fluid can be circulated through the lower chamber L for cooling the lower parts of the tubes by admitting it through a lateral nozzle 27 and discharging it through a lateral nozzle 28.

In many applications the temperatures prevailing within the two chambers on opposite sides of the intermediate tube sheet 20 is appreciable, e.g., 100° to 500° F., and to reduce the flow of heat through this tube sheet thermal insulation or lagging may be applied. For example, a layer 29 of refractory may be poured by access through the manway 17a on top of the intermediate tube sheet.

Figure 2:
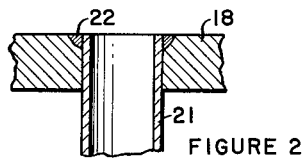
FIGURES 2, 3 and 4 are enlarged fragmentary detail views of parts of FIGURE 1 showing the connection of one tube respectively to the upper, the intermediate and the lower tube sheet.
Figure 3:
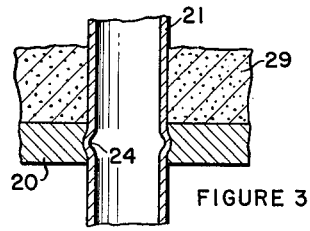
Figure 4:
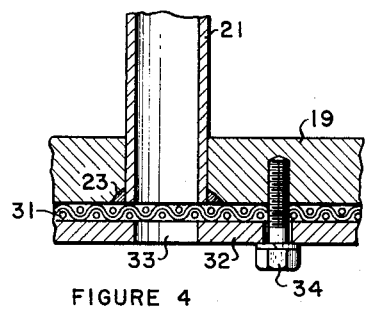

Each tube contains a stationary bed of granular catalyst 30 suitable for the chemical reaction to be performed at least within the upper parts, situated within the upper chamber, which constitute the reaction zones; the catalyst is omitted for clarity from FIGURES 2–4. In the embodiment shown the catalyst bed extends continuously to the bottom ends of the tubes. In this manner the reacting stream is continuously in contact with the catalyst, which promotes the desired reaction and suppressed side-reactions until the stream is cooled to below reaction temperature. Further, by providing an increased surface-to-volume ratio in the cooling zones, side reactions and polymerization in the effluent are reduced by destruction of free radicals. The catalyst granules are retained within the tubes by any suitable means such as a wire mesh screen 31 which is supported by a retaining plate 32 having a hole 33 beneath each tube and carried by the lower tube sheet by means of bolts 34.

In use, the mixture to be reacted is introduced through the top nozzle 14 and flows as a plurality of stream through the several tubes 21 in contact with the catalyst granules 30. The reaction temperature is controlled by the thermal fluid circulated through the upper chamber U. The invention is not restricted to any particular type or state of the thermal fluid. Thus, in one operation it is possible to admit at 25 a coolant liquid which vaporizes within the upper chamber and is discharged as a vapor at 26; however, it is also possible to employ a coolant, such as molten salt, which remains liquid. Immediately upon entering the parts of the tubes below the intermediate tube sheet the reactant stream is cooled by the coolant stream passed through the lower chamber L via the nozzles 27 and 28. Again, cooling may be by vaporizing a liquid—usually water—within the lower chamber or by maintaining the coolant therein in the liquid state. The reacted streams, cooled to a temperature below reaction temperature, are discharged from the lower ends of the tubes and the combined stream is drawn off via the nozzle 15.

In one typical application, such as the oxidation of propylene in the presence of steam to produce acrolein, the reaction is highly exothermic and the temperature of the thermal cooling fluid in the upper chamber may be of the order of 700° F., while that of the coolant within the lower chamber of the order of 340° F. The thermal insulation 29 prevents excessive loss of heat, making it possible to recover a greater amount of useful heat from the fluids discharged at 26.

Figure 6:
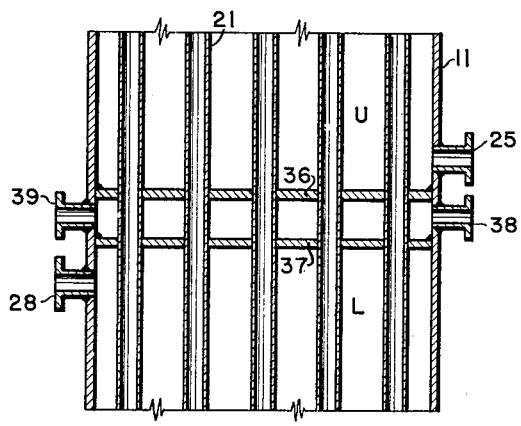
FIGURE 6 is a fragmentary view of a reactor-cooler showing a modified construction using a pair of intermediate tube sheets.

An advantage of using molten salts in such an application is that the pressures within the two chambers can be substantially atmospheric and a small seepage of the salt between the chamber is permissible; hence it is feasible to use a rolled joint as shown in FIGURE 3 or even to avoid any seal between the tubes and intermediate tube sheet, e.g., as is shown in FIGURE 6.

Figure 5:
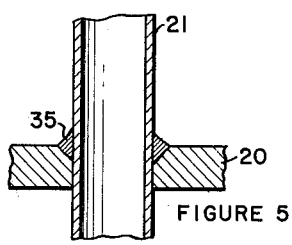
FIGURE 5 is a view corresponding to FIGURE 3 showing a modified construction.

When the pressures of the fluids within the two chambers differ considerably (as when the circulated fluids are vaporized and the vaporizing temperatures are controlled by regulating the pressures) and/or when contamination of one by the other cannot be tolerated it is often preferable to produce a more reliable seal by welding each tube to the intermediate tube sheet. This is illustrated in FIGURE 5, wherein each tube 21 is sealed to the tube sheet 20 by a weldment 35. Such weldments can be applied by welding each tube as it is inserted into the aligned holes in the three tube sheets, starting with tubes remote from the manway 17a. The thermal insulation 29 is optional and may be provided in the construction shown in FIGURE 5.

Referring to FIGURE 6, there is shown a modified construction wherein a pair of intermediate tube sheets or partitions 36 and 37 replaces the single tube sheet 20 of the previous embodiment. These tube sheets are welded to the vessel wall 11 and are mounted close together to bring the upper and lower chambers U and L into closely adjacent relation; preferably, the vertical distance between the tube sheets 36 and 37 is well below one-half the diameter of the vessel, as shown, to shorten the length of the passage through which the reactant stream flows from the reaction zone to the cooling zone. The tubes 21 may extend through the tube sheets or partitions without being sealed, or they may be sealed as shown in FIGURE 3. The reference numbers 25 and 28 denote parts previously described. The space between the tube sheets 36 and 37 communicates with the exterior of the vessel via one and, preferably, a pair of oppositely located nozzles 38 and 39, by which the flushing fluid can be passed through the space between these tube sheets at a pressure close to, e.g., equal to or slightly less than that which prevails within the chambers U and L, to flush out any thermal or coolant fluid that may seep through the joints about the tubes. The flushing stream further acts as a thermal insulator to reduce the heat flow when the chamber U and L are operated at greatly differing temperatures.

It is evident that the embodiment of FIGURE 6 operates in the same manner as the first embodiment but that the use of the double intermediate tube sheet in many cases obviates the need for the welded connection of FIGURE 5 and/or the thermal insulation 29.

Figure 7:
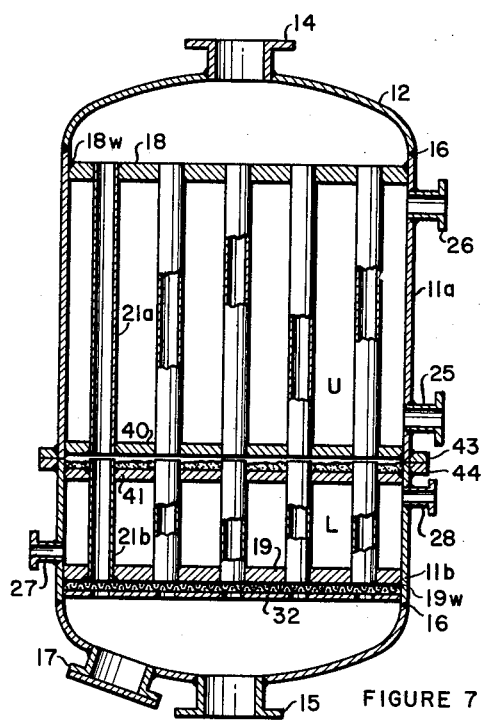
FIGURE 7 is a vertical sectional view through a further embodiment of a reactor-cooler employing separate, unconnected coaxial tubes in the reaction and cooling sections, and a two-part vessel is used.
Figure 8:
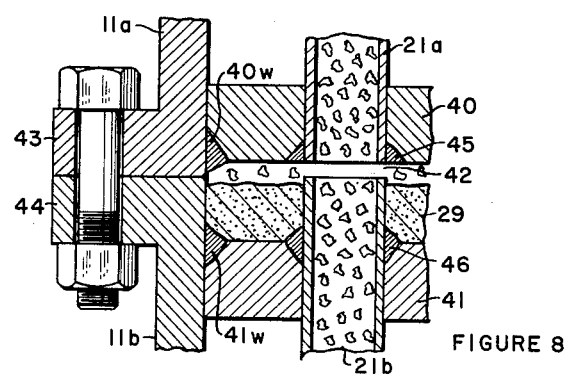
FIGURE 8 is an enlarged fragmentary detail view of a part of FIGURE 7, showing the connections of the tubes to the intermediate tube sheets and the conjoined vessel sections.

FIGURES 7 and 8 show another modification wherein the intermediate tube sheet comprises two half tube sheets 40, 41 and the tubes are discontinuous, that is, include upper tubes 21a which extend between the upper tube sheet 18 and the intermediate tube sheet 40, and lower tubes 21b which extend between the intermediate tube sheet 41 and the lower tube sheet 19. Each lower tube is coaxial with an upper tube and in close relation thereto, although a small gap, such as is shown at 42 in FIGURE 8, is permissible because radial mixing among the streams is not detrimental and, in any event, occurs to only a small degree. In this embodiment it becomes possible to assemble the vessel in two sections, i.e., the vessel comprises upper and lower sections 11a and 11b, which may be fabricated separately and then united by bolting flanges 43 and 44. This facilitates welding the tube sheets 18 and 19 marginally at the top and bottom, respectively, at 18w and 19w, and welding of the intermediate tube sheets at 40w and 41w (FIGURE 8), it being understood that the upper vessel section is inverted during fabrication to place the bottom side of the sheet 40 upward. The ends of the tubes 21a and 21b are welded as shown at 45 and 46. Other reference numbers denote parts previously described. As shown, the layer 29 of thermal insulating material can be applied to the top of the tube sheet 41 and for this purpose the upper ends of the tubes 21b project upwards above this sheet.

The sections 11a and 11b are assembled as shown in FIGURES 7 and 8 and the tubes are filled with granular material. It is possible to fill the lower tubes 21b, before assembling the sections, with catalyst or other material, such as inert bodies, preferably metallic, to provide increased surface-to-volume ratio, thereby suppressing side reactions, and to attain improved heat conductivity. Only the upper tubes 21a is filled with catalyst after assembly; some of the catalyst granules may spill out through the gap 42, as shown.

Figure 9:
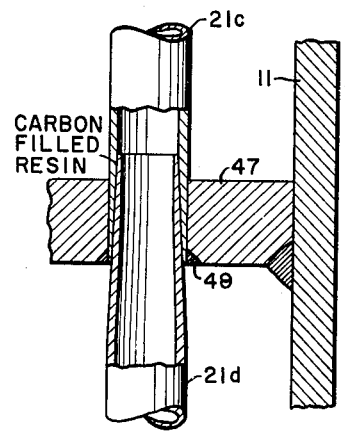
FIGURE 9 is an enlarged fragmentary detail view showing still another embodiment employing telescoped tubes.

FIGURE 9 illustrates another modification wherein three tube sheets are used and the upper and lower tubes are telescoped. The upper and lower tubes sheets are identical with the arrangements shown in FIGURES 1, 2 and 4. The vessel 11 carries an intermediate tube sheet 47 to which the upper tubes 21c are sealed by weldments 48. The lower tubes 21d have slightly tapered upper ends and are telescoped into the lower ends of the tubes 21c to seal them thereto. To improve the seal the inner surfaces of the tubes 21c may be reamed to a slight taper and a sealant composition may be applied to the lower tubes 21d before pushing them up. For example, the tubes 21c may be first attached to the upper and intermediate tubes sheets. The lower tube sheet is then fixed within the vessel 11 and each lower tube 21d is coated at its tapered end with a suitable mastic capable of withstanding the operating temperature, e.g., a carbon-filled epoxy resin, pushed upwards through the lower tube sheet and into the aligned tube 21c and welded to the lower tube sheet.

As was previously indicated, the tubes may contain catalyst throughout their length or only in the upper parts; in the latter case the lower portions, within the cooling chamber L, may be empty or contain inert or metallic bodies, such as scrap metal or balls, e.g., of copper, for supporting the catalyst and for improving heat conductivity, thereby facilitating rapid chilling of the reacted stream. As was noted above, with many reaction streams it is desirable to suppress side reactions by increasing the surface-to-volume ratio, and to this end at least the inlet parts of the lower tube portions, viz., at least the one-fourth nearest the upper tube portions, is advantageously filled with a solid.

Figure 10:
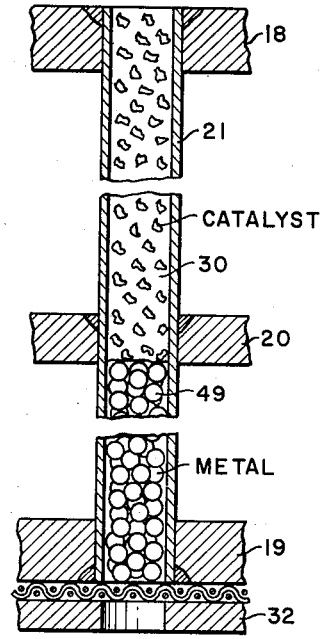
FIGURE 10 is a vertical sectional view through a single tube showing a tube packed in part with catalyst granules and in part with a heat-conductive metal.

FIGURE 10 illustrates the use of metal in the lower and catalyst in the upper portions, wherein granular catalyst 30 fills the tube above the level of the intermediate tube sheet 20 and metallic particles 40 fill the lower portion.

Figure 11:
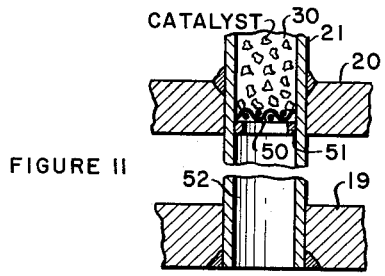
FIGURE 11 is a view of the lower part of a tube which is empty in the cooling section.

FIGURE 11 illustrates a variant in which the tube 21 contains a screen 50 supported on a ledge 51 and the catalyst 30 extends only above the screen, the lower portion 52 of the tube being empty.

Although certain specific arrangements were shown, it is evident that they are not restrictive. More particularly, the cooling section below the intermediate tube sheet or sheets was shown to have a smaller height than the reaction section; the relative lengths of these sections, however, would depend upon the nature of the reaction and the extent of cooling involved. Further, while it is preferred to flow the reactant stream, e.g., as a vapor, downwardly through the tubes, it is also possible to flow the stream upwards, provided that the space velocity is not so great as to disturb the granular bed or that a screen, such as the screen 31, is provided at the top.

Moreover, although tubes filled with granular catalyst at least in the entrance portions thereof were shown, this is not restrictive of the invention. Thus, the catalyst may be provided in any other manner, such as coated on the interior of the tubes.

We claim as our invention:
1. An integral tubular reactor-cooler which comprises:
   (a) a vertically elongated vessel having top and bottom end closures and containing at least a top and a bottom tube sheet and an intermediate partition extending transversely to said vessel and defining separated and closely adjacent first and second chambers situated respectively on opposite sides of the partition,
   (b) a plurality of vertical heat transfer tubes having a uniform size and wall thickness, said tube being fixed in sealed relation at least to said top and bottom tube sheets, said tubes in addition extending substantially continuously between said tube sheets and through said partition, said tubes providing continuous flow passages interconnecting the end spaces between said end closures and the respectively adjacent tube sheets,
   (c) means for circulating thermal fluids having different temperatures through said chambers, at least the fluid circulated through one chamber being a coolant,
   (d) catalyst within at least the portion of each said tube which lies within the other of said chambers,
   (e) means for admitting a reactant stream to the end space adjacent said other chamber and means for discharging the reacted stream from the end space adjacent said one chamber,
   (f) solid granules for promoting heat transfer between the interior of said tubes and the walls situated at least within the portions of the tubes surrounded by said one chamber, and
   (g) a layer of thermal insulating material on said partition.
2. An integral tubular reactor-cooler which comprises:
   (a) a vertically elongated vessel having top and bottom end closures and containing three single tube sheets situated respectively near the top, near the bottom, and at a level intermediate the top and bottom tube sheets in vertically spaced relation to define two separated and closely adjacent chambers situated respectively on opposite sides of the intermediate tube sheet,
   (b) a plurality of vertical heat transfer tubes fixed in sealed relation at least to said top and bottom tube sheets, said tubes having a uniform size and wall thickness and extending continuously between said two tube sheets and through said intermediate tube sheet, said tubes providing continuous flow passages interconnecting the end spaces between said end closures and the respectively adjacent tube sheets,
   (c) means for circulating thermal fluids having different temperatures through said chambers, at least the fluid circulated through one chamber being a coolant,
   (d) catalyst within at least the portion of each said tube which lies within the other of said chambers, and
   (e) means for admitting a reactant stream to the end space adjacent said other chamber and means for discharging the reacted stream from the end space adjacent said one chamber.

3. A tubular reactor-cooler as defined in claim 2 wherein said tubes are sealed also to said intermediate tube sheet to isolate said first chamber from the second.

References Cited in the file of this patent

UNITED STATES PATENTS

| | | |
|---|---|---|
| 714,703 | Ibert | Dec. 2, 1902 |
| 1,450,661 | Audianne | Apr. 3, 1923 |
| 1,917,718 | Jewett | July 11, 1933 |
| 2,117,359 | Porter | May 17, 1938 |
| 2,526,657 | Guyer | Oct. 24, 1950 |
| 2,532,756 | Brunjes et al. | Dec. 5, 1950 |
| 2,825,463 | Thomas | Mar. 4, 1958 |
| 2,986,454 | Jewett | May 30, 1961 |

FOREIGN PATENTS

| | | |
|---|---|---|
| 899,795 | Germany | Dec. 17, 1953 |